United States Patent [19]

Makita

[11] Patent Number: 4,469,455

[45] Date of Patent: Sep. 4, 1984

[54] ELECTRONIC EQUIPMENT

[75] Inventor: Masaru Makita, Tokyo, Japan

[73] Assignee: Canon Kabushiki Kaisha, Tokyo, Japan

[21] Appl. No.: 404,525

[22] Filed: Aug. 2, 1982

[30] Foreign Application Priority Data

Sep. 4, 1981 [JP] Japan .................................. 56-138369
Sep. 4, 1981 [JP] Japan .................................. 56-138372
Oct. 13, 1981 [JP] Japan .................................. 56-162012

[51] Int. Cl.³ .............................................. B41J 1/30
[52] U.S. Cl. .................................. 400/171; 400/144.2; 400/82
[58] Field of Search ...................... 400/171, 144.2, 82, 400/166

[56] References Cited

U.S. PATENT DOCUMENTS 4,026,403 5/1977 Inose et al. ........................... 400/171
4,037,208 7/1977 Osterlund et al. ................... 400/166
4,217,055 8/1980 Moon .................................... 400/171
4,281,938 8/1981 Phillips ................................. 400/151

FOREIGN PATENT DOCUMENTS 134216 2/1979 German Democratic Rep. ..................................... 400/171
2087115 5/1982 United Kingdom ................. 400/83

OTHER PUBLICATIONS

Cooper, "Electronic Typewriter . . . " IBM Technical Disclosure Bulletin, vol. 19, No. 11, p. 4242, 4/77.

Primary Examiner—William Pieprz
Attorney, Agent, or Firm—Fitzpatrick, Cella, Harper & Scinto

[57] ABSTRACT

There is disclosed an electronic equipment comprising character input means capable of inputting a plurality of characters; a first read-only memory for storing information of the characters of said character input means; first print means capable of printing a first set of characters on a print paper in response to an output signal from said first read-only memory; a second read-only memory for storing information of a second set of characters not included in said first set of characters; and selection means for selecting said second read-only memory when second print means capable of printing at least said second set of characters is used in place of said first print means.

6 Claims, 19 Drawing Figures

FIG. 1A

|   | 1 | 2 | 3 | 4 | 5 | 6 |
|---|---|---|---|---|---|---|
| 1 | A | I | Q | Y | 6 | ; |
| 2 | B | J | R | Z | 7 | ' |
| 3 | C | K | S | 0 | 8 | 2 |
| 4 | D | L | T | 1 | 9 | , |
| 5 | E | M | U | 2 | + | . |
| 6 | F | N | V | 3 | = | / |
| 7 | G | O | W | 4 | ½ | — |
| 8 | H | P | X | 5 | ] | § |

FIG. 1B

|   | 4 | 5 | 6 |
|---|---|---|---|
| 1 |   | ¢ | : |
| 2 |   | & | " |
| 3 | ) | * | 3 |
| 4 | ! | ( | , |
| 5 | @ | — | . |
| 6 | # | + | ? |
| 7 | $ | ¼ | ° |
| 8 | % | [ | ¶ |

FIG. 1C

|   | 1 | 4 | 5 | 6 |
|---|---|---|---|---|
| 1 | /// | /// | 6 | ö |
| 2 | /// | /// | 7 | ä |
| 3 | /// | 0 | 8 | # |
| 4 | /// | 1 | 9 | , |
| 5 | /// | 2 | ß | . |
| 6 | /// | 3 | ' | — |
| 7 | /// | 4 | ü | \| |
| 8 | /// | 5 | + | 2 |

FIG. 1D

|   | 4 | 5 | 6 |
|---|---|---|---|
| 1 |   | & | Ö |
| 2 |   | / | Ä |
| 3 | = | ( | ' |
| 4 | ! | ) | ; |
| 5 | " | ? | : |
| 6 | § | ' | — |
| 7 | $ | Ü | ° |
| 8 | % | * | 3 |

FIG. 5A
U.S.A

| FINGER NO. | TYPE | NAME |
|---|---|---|
| 1 | . | PERIOD |
| 2 | _ | UNDERLINE |
| 3 | - | HYPHEN |
| 4 | D | Dí(CAPITAL) |
| 5 | Z | Zí(CAPITAL) |
| 6 | " | QUOTATION MARKS |
| 7 | X | ēKS(CAPITAL) |
| 73 | o | ŌU(SMALL) |
| 74 | p | Pī:(SMALL) |
| 75 | i | ā i(SMALL) |
| 76 | w | dÃbl(SMALL) |
| 77 | k | Kei(SMALL) |
| 78 | ; | SEMICOLON |
| 79 | ' | APOSTROPHE |
| 80 | = | DOUBLE UNDERLINE |
| 81 | ○ | CIRCLE(UPPER) |
| 82 | ¼ | FRACTION |
| 83 | [ | BRACKET |
| 84 | ] | BRACKET |
| 85 | \| | STROKE |
| 86 | 2 | INDEX |
| 87 | ¶ | INDENT |
| 88 | / | SLASH |
| 89 | a | "AT" MARK |
| 90 | § | SECTION |
| 91 | ¢ | CENT |
| 92 | ½ | FRACTION |
| 93 | ± | PLUS, MINUS |
| 94 | 3 | INDEX |
| 95 | # | NUMBER SIGN |
| 96 | , | COMMA |

FIG. 5B
W. GERMANY

| FINGER NO. | TYPE | NAME |
|---|---|---|
| 1 | | |
| 2 | | |
| 3 | | |
| 4 | | |
| 5 | | |
| 6 | | |
| 7 | | |
| 73 | | |
| 74 | | |
| 75 | | |
| 76 | | |
| 77 | | |
| 78 | | |
| 79 | | |
| 80 | \| | STROKE |
| 81 | ` | ACCENT GRAVE |
| 82 | § | SECTION |
| 83 | Ü | UMLAUT(CAPITAL) |
| 84 | ´ | ACCENT AIGU |
| 85 | ä | UMLAUT(SMALL) |
| 86 | 2 | INDEX |
| 87 | Ö | UMLAUT(CAPITAL) |
| 88 | / | SLASH |
| 89 | Ä | "A"UMLAUT(CAPITAL) |
| 90 | 3 | INDEX |
| 91 | ö | UMLAUT(SMALL) |
| 92 | β | BETA |
| 93 | # | NUMBER SIGN |
| 94 | ○ | CIRCLE(UPPER) |
| 95 | ü | UMLAUT(SMALL) |
| 96 | , | COMMA |

FIG. 5C
SWISS

| FINGER NO. | TYPE | NAME |
|---|---|---|
| 1 | | |
| 2 | | |
| 3 | | |
| 4 | | |
| 5 | | |
| 6 | | |
| 7 | | |
| 73 | | |
| 74 | | |
| 75 | | |
| 76 | | |
| 77 | | |
| 78 | | |
| 79 | | |
| 80 | ù | ACCENT GRAVE"ù" |
| 81 | ` | ACCENT GRAVE |
| 82 | ç | CEDILLE |
| 83 | ê | ACCEOT AIGU |
| 84 | \| | STROKE |
| 85 | £ | POND |
| 86 | ¨ | UMLAUT |
| 87 | è | ACCENT GRAVE"e" |
| 88 | / | SLASH |
| 89 | à | ACCENT GRAVE"a" |
| 90 | § | SECTION |
| 91 | ö | UMLAUT(SMALL) |
| 92 | ´ | ACCENT AIGU |
| 93 | ü | UMLAUT(SMALL) |
| 94 | ^ | ACCENT |
| 95 | ä | "a"UMLAUT |
| 96 | , | COMMA |

U.S.A

W. GERMANY

SWISS

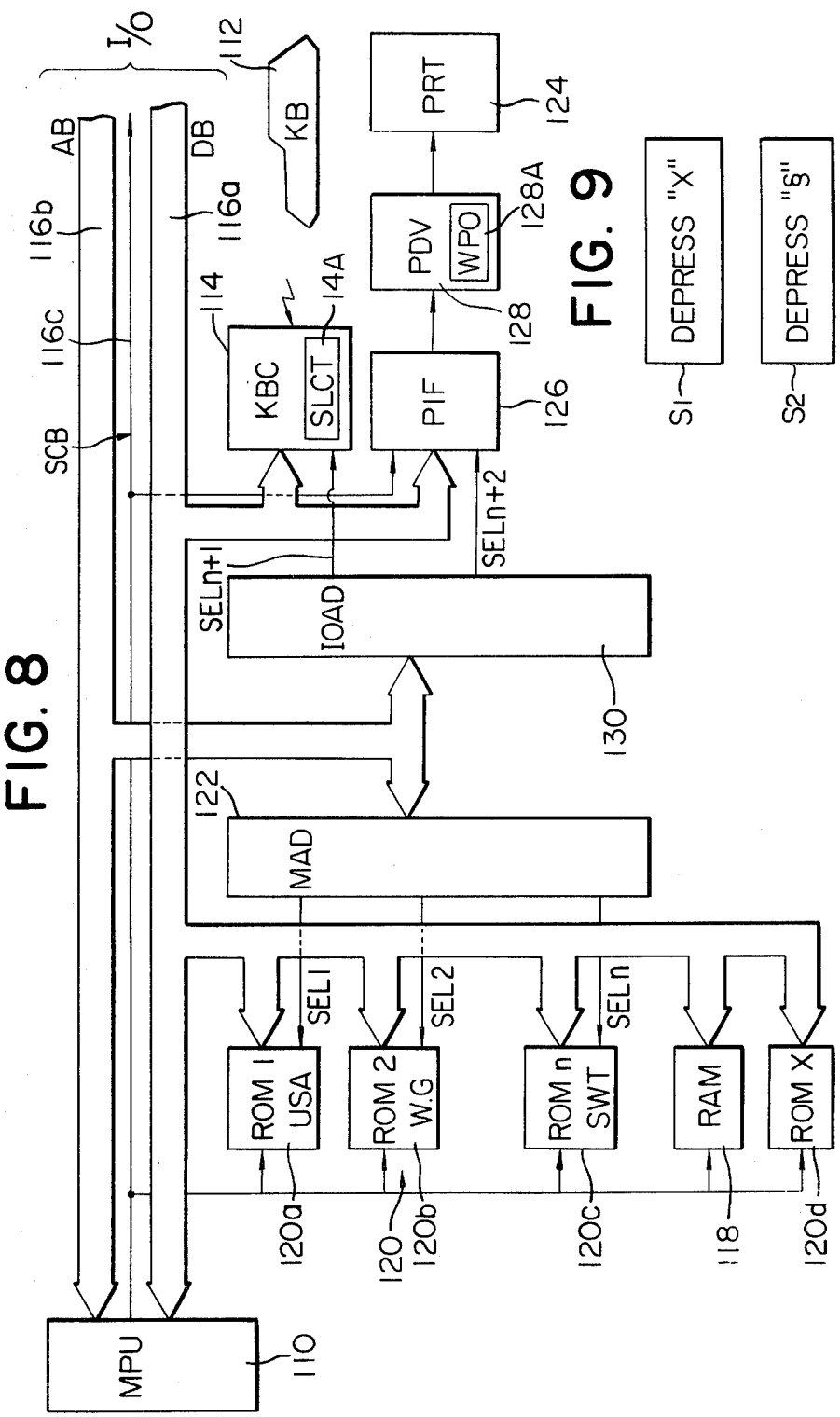

FIG. 11A

| | INTERNAL CODE | TYPES |
|---|---|---|
| 1 | 21 | a |
| 2 | 22 | b |
| 3 | 23 | c |
| 4 | 24 | d |
| 5 | 25 | e |
| 6 | 26 | f |
| 7 | 27 | g |
| | 7B | h |
| 83 | 7C | 7 |
| 84 | 7D | 8 |
| 85 | 7E | 9 |
| 86 | 7F | 0 |
| 87 | 80 | @ |
| 88 | 81 | % |
| 89 | 82 | / |
| 90 | 83 | $ |
| 91 | 84 | ] |
| 92 | 85 | [ |
| 93 | 86 | ¢ |
| 94 | 87 | # |
| 95 | 88 | ° |
| 96 | 89 | = |

FIG. 11B

| | INTERNAL CODE | TYPES |
|---|---|---|
| 1 | 21 | a |
| 2 | 22 | b |
| 3 | 23 | c |
| 4 | 24 | d |
| 5 | 25 | e |
| 6 | 26 | f |
| 7 | 27 | g |
| | 7B | h |
| 83 | 7C | 7 |
| 84 | 7D | 8 |
| 85 | 7E | 9 |
| 86 | 7F | 0 |
| 87 | 8A | TM |
| 88 | 81 | % |
| 89 | 82 | / |
| 90 | 83 | $ |
| 91 | 8B | ç |
| 92 | 8C | ⟨ |
| 93 | 86 | ¢ |
| 94 | 87 | # |
| 95 | 88 | ° |
| 96 | 89 | = |

ELECTRONIC EQUIPMENT

BACKGROUND OF THE INVENTION

1. Field of the Invention

The present invention relates to an electronic equipment such as an electronic typewriter having character input means and character print means, and more particularly to a general purpose electronic equipment which allows economic manufacture of an electronic typewriter suitable for use in various countries without additional memory.

2. Description of the Prior Art

A typewriter having a different daisy wheel (type disc) and a different keyboard for each of various countries is known. In such a typewriter, since different characters are selected by one key input signal depending on the countries in which it is used, a printing impression and a character pitch vary. Accordingly, hardware must be modified. For this purpose, information on the characters in various countries, that is, printing impressions and character pitches, must be corrected. In order to meet the above requirements, difficulty is encountered in the manufacture and therefore manufacturing cost increases.

The type wheels to be used in such an electronic typewriter are available from various manufacturers but the prior art printers can use only the type wheels manufactured by the same manufacturer and hence they lack compatibility. If a typewheel of another manufacturer is used, a correct character will not be printed. In an electronic typewriter having a display, a printed character and a displayed character may not match.

SUMMARY OF THE INVENTION

It is an object of the present invention to provide an electronic equipment which allows the use of different type wheels having different type sets by simple means.

BRIEF DESCRIPTION OF THE DRAWINGS

FIGS. 1A to 1D show contents of character code registration ROM tables corresponding to key arrangements for use in the U.S.A. and West Germany, of an electronic typewriter;

FIGS. 5A, 5B and 5C show tables of finger numbers versus types of type wheels for use in the U.S.A., West Germany and Switzerland, respectively;

FIG. 8 shows a block diagram of another system configuration of the present invention;

FIG. 9 shows a flow chart for a keying sequence;

FIGS. 11A and 11B show conversion tables for different type wheels.

DETAILED DESCRIPTION OF THE PREFERRED EMBODIMENTS

Prior to the explanation of the preferred embodiments, key arrangements for use in various countries are explained with reference to FIGS. 1A to 1D. FIG. 1A shows a ROM table corresponding to a key arrangement of a keyboard for use in the U.S.A. (48-key keyboard), FIG. 1B shows a ROM table when a shift key has been depressed in FIG. 1A, FIG. 1C shows a ROM table of a keyboard for use in West Germany (48-key keyboard) and FIG. 1D shows a ROM table when a shift key has been depressed in FIG. 1C. In FIG. 1C, a hatched area corresponding to coordinates 1,1-4,2 includes the same ROM table portion as FIG. 1A and omitted in the description of the embodiment.

Figure 2:
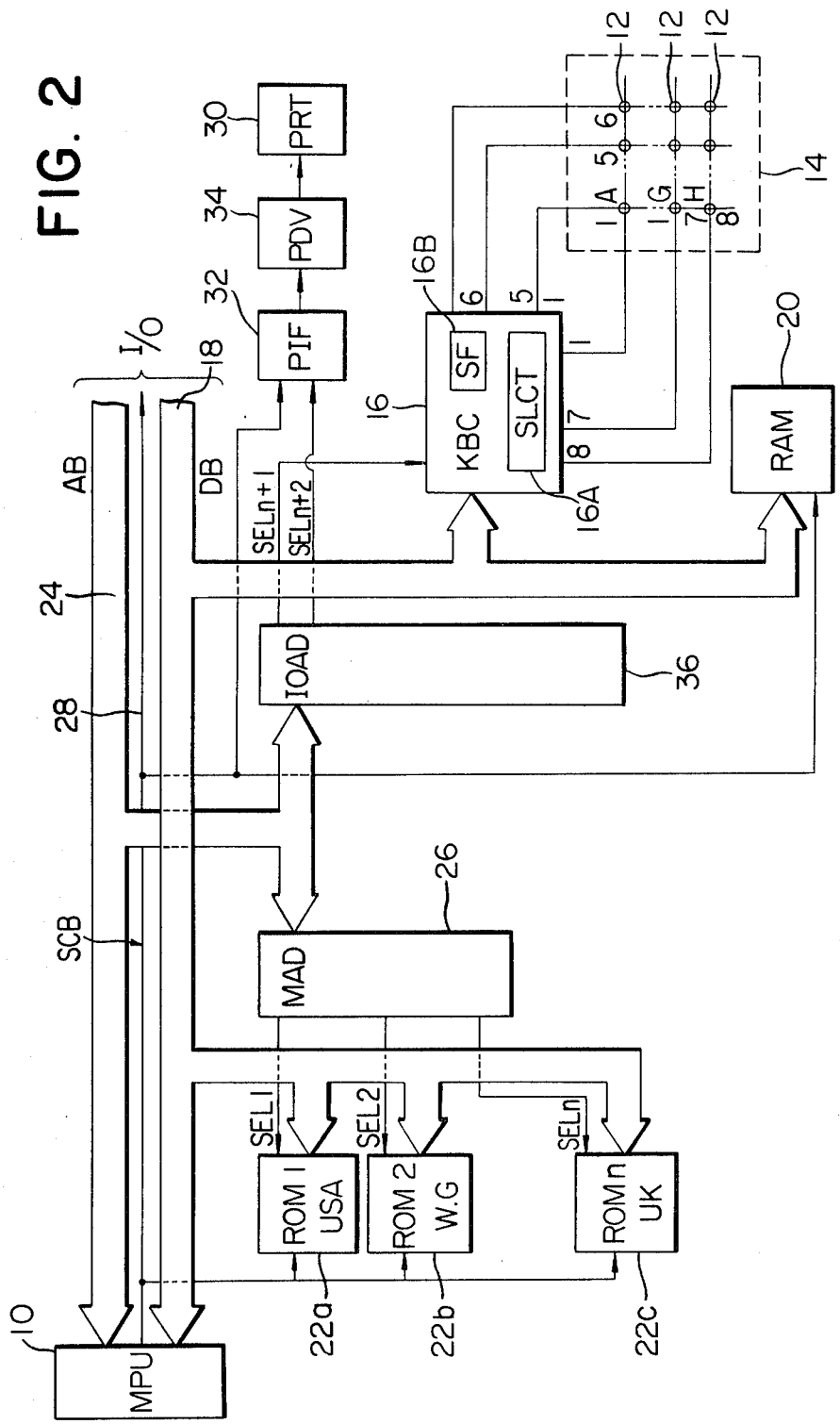
FIG. 2 shows a block diagram of a system configuration of an electronic equipment of the present invention.

FIG. 2 shows a block diagram of a key-controlled printer in accordance with the present invention. Numeral 10 denotes a microprocessor (MPU) for supervising the control for an overall system, numeral 14 denotes a keyboard having a plurality of keys 12, which is external input means. A keyed-in instruction from the keyboard 14 is supplied to a keyboard controller (KBC) 16. The MPU 10 receives keyboard signals such as signals from a keyboard matrix and a shift key through the KBC 16 and a data bus (DB) 18. Numeral 20 denotes a random access memory (RAM) which contains a character input buffer memory (not shown) for temporarily and sequentially storing the keyboard signals from the KBC 16 and flag registers (not shown) for registering system status. The KBC 16 contains a country designation register 16A for designating a destination country and a shift key register 16B for identifying the depression of the shift key on the keyboard 14. Numerals 22a, 22b and 22c denote read-only memories ROM 1-ROM n which store character conversion tables for the keyed-in instructions. For example, the ROM 1 22a stores the character codes for the U.S.A. keyboard arrangement, and printing impressions and print pitches, as required, and the ROM 2 22b and ROM n 22c store the character codes inherent to the West Germany keyboard arrangement and the U.K. keyboard arrangement, respectively. Thus, the character codes shown in FIGS. 1A and 1B are stored in the ROM 1 22a of FIG. 2 and the character codes shown in FIGS. 1C and 1D are stored in the ROM 2 22b of FIG. 2. The ROM 1-ROM n 22a-22c and the RAM 20 are connected to the MPU 10 through the DB 18. Address information (absolute address) is sent from the MPU 10 to an address bus (AB) 24 which is connected to a memory address decoder (MAD) 26. One of the ROM 1-ROM n is selected by selection signals SEL 1-SEL n from the MAD 26. A system control bus (SCB) 28 is connected to the ROM 1-ROM n and the RAM 20 to provide a read timing to the ROM 1-ROM n and a read/write timing to the RAM 20. Thus, the MPU 10 can sequentially write the input signals from the KBC 16 to the RAM and read the signals therefrom. When the KBC 16 supplies the signals sequentially, the MPU 10 sequentially writes the signals and when the KBC 16 does not supply the keyed-in instruction signal, the MPU 10 processes the stored signals. Regarding an output control, a printer (PRT) 30 is driven through a printer interface (PIF) 32 and a printer driver (PDV) 34. Numeral 36 denotes an input/output address decoder (IOAD). Addresses allocated to the KBC 16 and the PIF 32 are selected by selection signals SEL n+1 and SEL n+2 from the IOAD 36. The DB 18 and the SCB 28 are connected to the KBC 16 and the PIF 32 so that the KBC 16 and the PIF 32 are controlled by the MPU 10.

Figure 3:
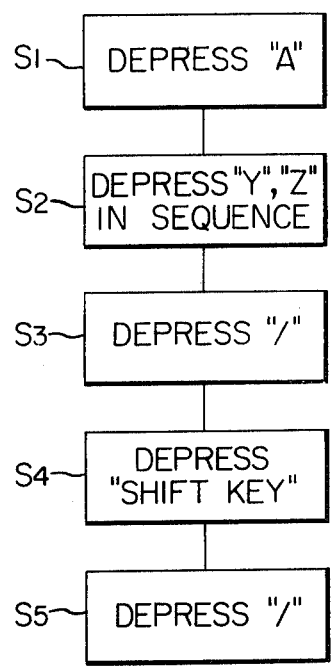
FIG. 3 shows a flow chart for a keying sequence of a keyboard for use in the U.S.A.

The operation of the present embodiment thus constructed is now explained with reference to FIGS. 3 and 4 which show operation sequences. FIG. 3 shows a sequence for the U.S.A. keyboard and FIG. 4 shows a sequence for the West Germany keyboard.

For the U.S.A. keyboard, "0" has been registered in the register (SLCT) 16A of the KBC 16 during the manufacturing step. When a key "A" is depressed in a step $S_1$, the code at (1, 1) in FIG. 1A is read into the MPU 10 as a key data. The read key data is written into the RAM 20. If an input signal due to the depression of a key subsequent to the depression of the key "A" is not supplied, the MPU 10 carries out an internal code conversion operation to the written key data (1, 1). Since the U.S.A. keyboard is being considered, the content of the SLCT 16A is "0". Accordingly, the MAD 26 selects the selection signal SEL 1 and the ROM 1 22a for the code conversion is specified by the absolute address. The key data (1, 1) specifies a relative address in the conversion table ROM 1 so that the MPU 10 looks up an internal code of the character "A" and supplies the information to the PDV 34 through the PIF 32 to print the character "A". If keys "Y" and "Z" are sequentially depressed in a step $S_2$, signals (4, 1) and (4, 2) are sequentially written into the RAM 20. The subsequent operation is same as that for the signal input character "A". When a key "/" is depressed in a step $S_3$, a signal (6, 6) is written into the RAM 20. When a shift key is depressed, a certain value is added to the key data in the KBC 16 in order to eliminate the recognition by other than KBC 16 of the use of the shift key to the key data. To this end, the ROM tables of FIGS. 1A and 1B are stored in the ROM 1 as consecutive tables. Thus, when the key "/" is depressed in a step $S_5$ after the depression of the shift key in a step $S_4$, a key code (9, 6) for "?" is generated by the KBC 16.

Figure 4:
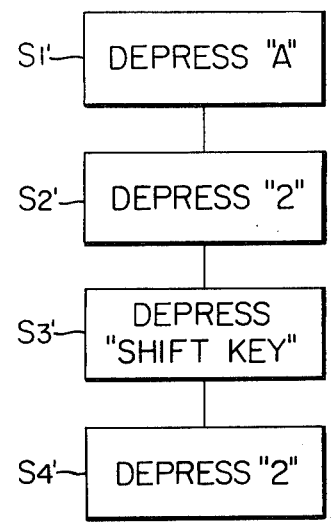
FIG. 4 shows a flow chart for a keying sequence of a keyboard for use in West Germany.

FIG. 4 shows an operation sequence for the West Germany keyboard. The SLCT 16A has been set to "1". When the key "A" is depressed in a step $S'_1$, the internal code (1, 1) is supplied from the KBC 16 to the MPU 10. Since it is in the common internal code area, the ROM 1 22a is selected by the selection signal SEL 1 so that the internal code is produced in the same manner as the U.S.A. keyboard sequence.

When a numeric key "2" is depressed in a step $S'_2$, it is beyond the common code area and hence the selection signal SEL 2 is selected by the MAD 26 so that an internal code for "2" is read from the ROM 2 22b. When the key "2" is depressed in a step $S'_4$ after the depression of the shift key in a step $S'_3$, the KBC 16 operates in the same manner as the U.S.A. keyboard sequence so that the information corresponding to the key arrangements shown in FIGS. 1C and 1D are combined as consecutive tables to allow the internal code corresponding to " " to be stored in the ROM 2 22b.

As seen from the above embodiment, since the character information table common to the key arrangements for various countries and character information tables which are not common to the various countries are stored in the ROM of the control circuit of the printer, the character codes corresponding to the selected keyboard can be readily read out by merely setting the country designation register to a particular value.

FIGS. 5 to 9 show further details of the present invention.

Prior to the explanation of the embodiments, daisy wheels for various countries are briefly explained with reference to FIGS. 5A–5C. FIG. 5A shows a wheel for the U.S.A., FIG. 5B shows a wheel for West Germany and FIG. 5C shows a wheel for Switzerland. As seen from those figures, fingers #1–#79 have a common type arrangement for those countries and fingers #80–#96 have seventeen types arranged differently for those countries.

Figure 6:
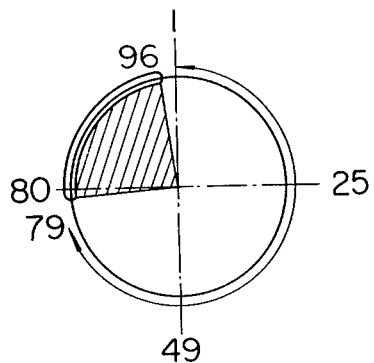
FIG. 6 shows a plan view of a non-common finger arrangement portion of the type wheel.
Figure 7A:
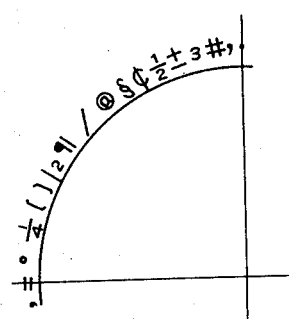
FIGS. 7A, 7B and 7C show plan views of character arrangements corresponding to non-common fingers of the type wheels for use in the U.S.A., West Germany and Switzerland.
Figure 7B:
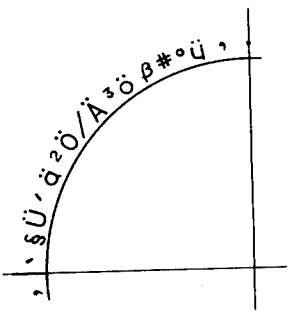
Figure 7C:
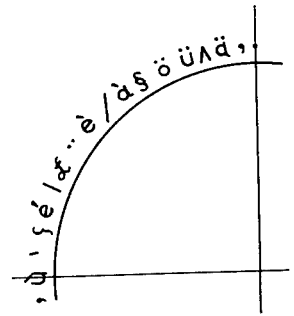

In the present embodiment, noting the above finger arrangement of the daisy wheel, the finger arrangement for the fingers #1–#79 of the U.S. wheel, for example, is used as a standard and it is used in common with the corresponding portions of the other country wheels, and the finger arrangements for the fingers #80–#96 which are different from country, to country are designated by the country designation register in the KBC 16 so that a desired character corresponding to a finger shown in FIG. 5A, 5B or 5C for a keyed-in signal is printed. A hatched area shown in FIG. 6 shows the non-common type arrangement area for the various countries (the area for the fingers #80–#96), and FIGS. 7A, 7B and 7C show the different type arrangements of the fingers #80–#96 for the various countries. FIG. 7A shows the wheel for the U.S.A., FIG. 7B shows the wheel for the West Germany and FIG. 7C shows the wheel for Switzerland.

FIG. 8 shows a system configuration of the printer of the present invention which allows the use of different daisy wheels for the U.S.A., West Germany and Switzerland. Numeral 110 denotes a microprocessor (MPU) for supervising the control of an overall system and numeral 112 denotes a keyboard (KB) having a plurality of keys as external input means to the printer. Keyed-in instruction signals from the KB 112 are supplied to the MPU 110 through a keyboard controller (KBC) 114 and a data bus (DB) 116a. Numeral 118 denotes a random access memory (RAM) which contains a character input buffer memory (not shown) for temporarily storing non-sequential signals from the KBC 114 and flag registers (not shown) for indicating system status. Numeral 120 denotes a read-only memory (ROM). A ROM 1 designated by 120a stores character information for the fingers #1–#96 of the basic U.S. wheel, and a ROM 2 designated by 120b stores character information for the fingers #80–#96 the West Germany wheel. The number n of the ROM's is determined by the number of countries which use different type sets. A ROM n designated by 120c stores character information for the fingers #80–#96 of the Switzerland wheel. Thus, the numbers of character information stored in the respective ROM's are 96 for the ROM 1 and 17 for the ROM 2 and ROM n.

The ROM 1–ROM n 120a–120c are connected to the MPU 110 through the DB 116a and address information is sent thereto through an address bus (AB) 116b, which is connected to a memory address decoder (MAD) 122. The MPU 110 refers a country designation register SLCT in the KBC 114 to select one of the ROM's 120a–120c by selection signals SEL 1–SEL n supplied through the MAD 122. A system control bus (SCB) 116c is connected to the ROM's 120a–120c and the RAM 118. The SCB 116c provides a read timing to the ROM's 120a–120c and a read/write timing to the RAM 118. Thus, the MPU 110 can sequentially write the input signals from the KBC 114 into the RAM 118 and reads the stored signals therefrom. When the KBC 114 supplies sequential signals, the MPU 110 sequentially writes the signals, and when the KBC 114 does not supply the input signal, the MPU 110 sequentially reads the signal for processing. When the input signal from the KBC 114 is a character signal, one of 114 different character codes 20(H)-AF(H) is assigned to the signal. The 114 character codes cover all characters for the three countries and print operation is carried out in accordance with the character code. A conversion operation of the input signal from the KBC 114 to an internal code is carried out by referring an internal code conversion table stored in a read-only memory (ROMX) as shown in FIG. 1 which includes the ROM's 120a-120c shown in FIG. 2. Control for an output unit is carried out by driving a printer (PRT) 124 by a printer interface (PIF) 126 and a printer driver (PDV) 128. The information supplied to the PIF 126 by the MPU 110 includes character codes converted from the keyboard input signals to the internal codes, a horizontal [+] feed distance, a horizontal [−] feed distance (where [+] represents rightward and [−] represents leftward), and a vertical feed distance (where a forward direction of paper feed is [+] and a reverse direction is [−]). The PDV 128 includes a wheel position counter (WP) 128A which indicates a finger position of the wheel which currently faces a hammer of the printer. It is counted by starting from an underline finger (#2) in + or − direction around the wheel and reset to zero at the reference (start) position. Numeral 130 denotes an input/output address decoder (IOAD). The addresses allocated to the KBC 114 and the PIF 126 are selected by selection signals SEL n+1 and SEL n+2 from the IOAD 130. The DB 116a and the SCB 116c are connected to the KBC 114 and the PIF 126 so that the KBC 114 and PIF 126 are controlled by the MPU 110.

A control sequence of the system in the embodiment of FIG. 8 is now explained with reference to FIG. 9.

Referring to FIG. 9, an operation sequence of the U.S.A. keyboard is first explained. When a key "X" on the keyboard is depressed in a step $S_1$, a matrix signal for "X" is supplied to the KBC 114. Because of the U.S.A. keyboard, the SLCT 114A of the KBC 114 has been set to "0". The KBC 114 transfers the input signal to the MPU 110 through the DB 116a. The MPU 110 sequentially writes the data into the RAM 118 through the DB 116a and the SCB 116c. Since the keys are not sequentially depressed in the present example, the MPU 110 determines that a subsequent input signal is absent and reads out the written key input data and refers the code conversion table stored in the ROMX 120d to convert it to an internal code. Since the code conversion table in the ROMX 120d has relative addresses corresponding to the keyboard signals, the MPU 110 readily converts the keyboard signal to the internal code through the SCB 116c and the DB 116a to result in the internal code (3, 8). The content of the ROM 1 120a is decoded in accordance with the content (0) of the SLCT 114A to select the wheel finger corresponding to "X" shown in the table of FIG. 1A. The ROM 1 120a is constructed to allow the determination of the wheel finger number by designating the internal code. By subtracting 20 (in hexadecimal notation) from the character code (20-7F), the position of the type "X" relative to the reference position of the wheel can be determined. The resulting internal code and the wheel finger number of the type "X" are transferred to the PIF 126 through the DB 116a in accordance with the address specified by the selection signal SEL n+2 from the IOAD 30. THe PIF 126 delivers those signals to the PDV 128 in accordance with the timing control signal from the SCB 128. Based on those signals, the PDV 128 determines a rotational angle of the wheel to select and print the proper type. When "§" is depressed in a step $S_2$, in the U.S.A. keyboard, the same operation as the "X" key input is carried out. As seen from FIG. 5A, the wheel finger numbers for "X" and "§" are 7 and 90, respectively.

The West Germany keyboard is now considered. In this case, "1" has been set in the SLCT. The operation from the depression of the key "X" to the internal code conversion for "X" is same as that of the U.S.A. keyboard. Since the character "X" is the common character to various countries, the address for the ROM 1 120a is selected by the selection signal SEL 1 from the MAD 122. The subsequent print operation is also same as that for the U.S.A. keyboard. The key "§" is next depressed. It is different from the key "X" in that it is not the common character. Since the content of the SLCT is "1", the MAD 122 selects the ROM 2 120b by the selection signal SEL 2. As seen from FIG. 5B, the wheel finger numbers of "X" and "§" are 7 and 82, respectively.

For the Switzerland keyboard, the same operation as the West Germany keyboard operation is carried out, but since the content of the SLCT is "n", the ROM 1 120a is selected when the key "X" is depressed and the ROM n 120c is selected when the key "§" is depressed. In this case, the wheel finger numbers for "X" and "§" are 7 and 90, respectively. In the illustrated example, the wheel finger numbers for the characters "X" and "§" for the U.S.A. keyboard and the Switzerland keyboard are identical, respectively. For other characters, the wheel finger numbers are generated in accordance with FIGS. 1A and 1C.

In accordance with the present embodiment, by merely setting an appropriate number for a desired country in the register in the keyboard of the typewriter or printer, a wheel finger number corresponding to the depressed key can be determined. Thus, when the typewriters are to be shipped to a plurality of countries, it is not necessary to modify the hardware such as printed circuit boards incorporating the control circuit for each of the destination countries. Furthermore, since the character information of the common wheel fingers to the various countries is stored in the common table ROM and the non-common character information is stored in other ROM's, the conversion tables for all of the wheel fingers are not necessary when the printers for various countries are manufactured. Thus, a manufacturing cost can be reduced.

Figure 10:
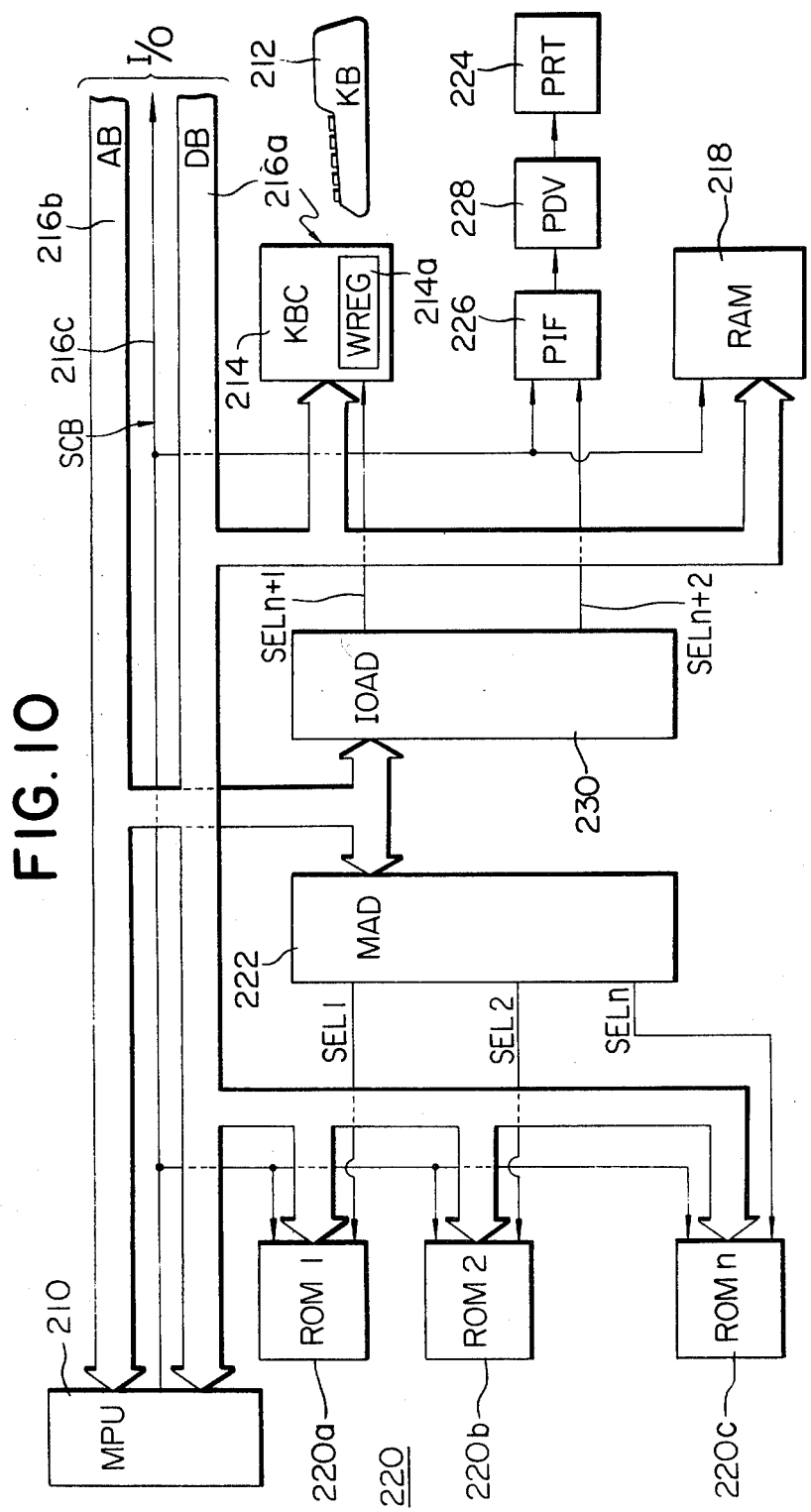
FIG. 10 shows a block diagram of a further system configuration of the present invention.

FIG. 10 shows a system configuration of another embodiment of the printer of the present invention. Numeral 210 denotes a microprocessor (MPU) for supervising the control of an overall system, and numeral 212 denotes a keyboard (KB) having a plurality of keys as external input means to the printer. Keyed-in instruction signals from the KB 212 are supplied to the MPU 210 through a keyboard controller (KBC) 214 and a data bus (DB) 216a. Numeral 218 denotes a random access memory (RAM) which contains a character input buffer memory (not shown) for temporarily storing non-sequential signals from the KBC 214 and flag registers (not shown) for indicating system status. Numeral 220 denotes a read-only memory (ROM). A ROM 1 designated by 220a stores character information for type sets of a basic type wheel provided by a certain manufacturer. For example, internal codes for 96 different types is stored as shown in FIG. 11A. ROM 2-ROM n designated by 220b-220c store character information for those portions of type sets provided by other manufacturers which are not common to the type set stored in the ROM 1 220a. For example, as shown in FIG. 11B, the ROM n 220c does not store the information of the types in the common area (hatched area) of the type set provided by the other manufacturer but stores the information of the remaining ten types #87-#96. Thus, the ROM 1-ROM n are used as the character code conversion tables and the ROM 2-ROM n store the different character codes for the other manufacturers.

The KCB 214 includes a wheel register (WREG) 214a for registering information relating to the type of the type wheel currently loaded to the printer.

The ROM 1-ROM n 220a-220c are connected to the MPU 210 through the DB 216a and address information is sent out from the MPU 210 to an address bus (AB) 216b, which is connected to a memory address decoder (MAD) 222. The MPU 210 refers the wheel register (WREG) 114a in the KCB 214 to select one of the ROM's 220a-220c in accordance with selection signals SEL 1-SEL n from the MAD 222. A system control bus (SCB) 16c is connected to the ROM's 220a-220c and the RAM 218 to provide a read timing to the ROM's 220a-220c and a read/write timing to the RAM 218. Thus, the MPU 210 can sequentially write the input signals from the KBC 214 into the RAM 218 and read the stored signal. When the KBC 214 supplies sequential input signals, the MPU 210 sequentially writes the signals, and when the KBC 214 does not supply the input signal, the MPU 210 sequentially reads the written signals for processing.

When the MPU 210 converts the input signal from the KBC 214 to the character code, it refers the wheel information stored in the WREG 214a and selects one of the tables in the ROM 1-ROM n in accordance with the selection signals SEL 1-SEL n from the MAD 222 to convert the input signal to the proper internal code. As described above, the ROM 2-ROM n store only the information of the types which are not common to the type set of the ROM 1 but are different from the type set of the ROM 1. Thus, the MPU 210 first converts the input signal from the KB 212 to the character code based on the information of the type set stored in the ROM 1, and if the wheel information in the WREG 214a indicates that the type set is a different one and if the type other than the common area types is selected, the MPU 210 invalidates the converted code and refers one of the ROM 2-ROM n designated by the WREG to reconvert the input signal.

Regarding the control of an output unit, a printer (PRT) 224 is driven through a printer interface (PIF) 226 and a printer driver (PDV) 228. The information supplied by the MPU 210 to the PIF 226 includes the character codes converted from the keyboard input signals to the internal codes, a horizontal [+] feed distance, a horizontal [−] feed distance (where [+] represents rightward and [−] represents leftward), and a vertical feed distance (where a forward direction of paper feed is [+] and a reverse direction is [−]). Numeral 230 denotes an input/output address decoder (IOAP). Addresses allocated to the KBC 214 and the PIF 226 are selected by selection signals SEL n+1 and SEL n+2 from the IOAD 230. The DB 216a and the SCB 216c are connected to the KBC 214 and the PIF 226 so that the KBC 214 and the PIF 226 are controlled by the MPU 210.

Let us consider the type wheels provided by a manufacturer (l) and a manufacturer (n). FIGS. 11A and 11B show the type wheels provided by the manufacturers (l) and (n), respectively. The types #1-#86 of those wheels are identical and the types #87-#96 are different. The character information for the non-common types is stored in the ROM n.

When the typewheel of the manufacturer (l) is loaded and a key " a " corresponding to the type #87 is depressed, the character " a " is printed. On the other hand, when the typewheel of the manufacturer (n) is loaded, the ROM n is selected by the information in the WREG 214a so that the internal code 8A is generated. As a result, the type "TM" is selected and printed as shown in FIG. 11B. The setting of the WREG 214a may be carried out by reading a mark on the typewheel indicating the manufacture code or by manual setting.

When a display is used in combination with the printer, the input signal is converted to a display code to match the printed character to the displayed character.

What I claim is:

1. An electronic printing system that can incorporate any one of a plurality of interchangeable type elements, comprising:
    printing means;
    a first type element carrying a plurality of first characters and mountable in said printing means in order to print said first characters;
    a second type element carrying a plurality of second characters and mountable interchangeably with said first type element in said printing means in order to print said second characters, one portion of each of said plurality of first characters and said plurality of second characters being common and a different portion of each of said plurality of first characters and said plurality of second characters not being common;
    a first read-only memory containing information relating to said one portion of each of said plurality of first characters and said plurality of second characters which are common and information relating to said different portion of said plurality of first characters;
    a second read-only memory containing information relating to said different portion of said plurality of second characters not in common with said different portion of said plurality of first characters; and
    means for selecting said first read-only memory when said first type element is mounted in said printing means and for selecting both said first read-only memory and said second read-only memory when said second type element is mounted in said printing means.

2. An electronic printing system according to claim 1, wherein each of said first and second type elements includes a daisy wheel.

3. An electronic printing system according to claim 1, further comprising a keyboard for entering characters into said printing means to be printed.

4. An electronic printing system according to claim 1, wherein said first and second type elements carry characters used respectively in languages of first and second countries.

5. An electronic printing system according to claim 1, wherein said first and second type elements carry characters in a manner used respectively by first and second manufacturers.

6. An electronic printing system according to claim 2, wherein the different portion of said second characters is arranged on said second daisy wheel within the range of a specific angular region.

* * * * *

UNITED STATES PATENT AND TRADEMARK OFFICE
CERTIFICATE OF CORRECTION

PATENT NO. : 4,469,455
DATED : September 4, 1984
INVENTOR(S) : Masaru Makita

It is certified that error appears in the above-identified patent and that said Letters Patent is hereby corrected as shown below:

On the title page, Item (54) should read;

-- ELECTRONIC PRINTER UTILIZING ONE OF A PLURALITY OF TYPE ELEMENTS--.

Col. 3, line 29, between "is" and "same" insert --the--.

Col. 4, line 18, after "country" (first occurrence) delete -- , --; and insert the -- , -- after "country" (second occurrence);

line 28, delete "the" before "West Germany".

Col. 5, line 26, change "(WP)" to --(WPO)--.

Col. 6, line 18, between "also" and "same" insert --the--.

Col. 8, line 9, change "a" to -- ⓐ --;
line 10, change "a" to -- ⓐ --.

Signed and Sealed this

Twenty-seventh Day of August 1985

[SEAL]

Attest:

DONALD J. QUIGG

Attesting Officer   Acting Commissioner of Patents and Trademarks